F. L. WHEELING & F. A. ROGERS.
CENTERING DEVICE.
APPLICATION FILED SEPT. 21, 1911.
1,025,728.
Patented May 7, 1912.
2 SHEETS—SHEET 1.
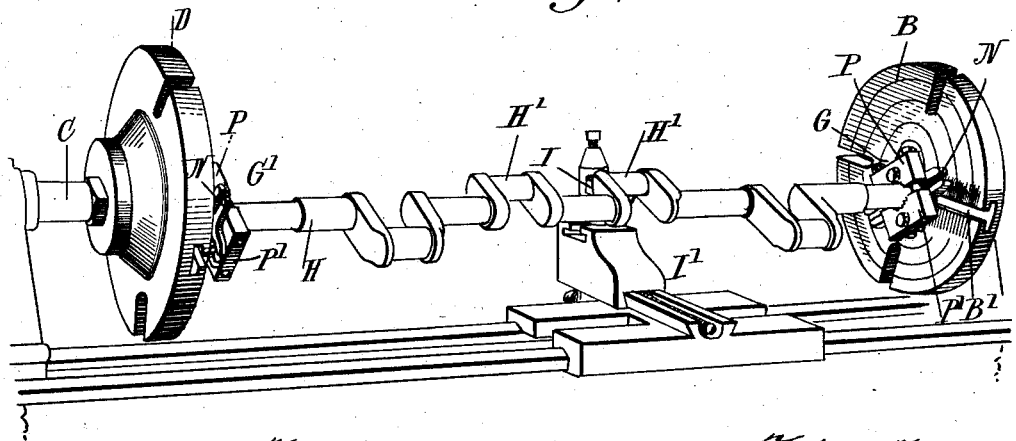
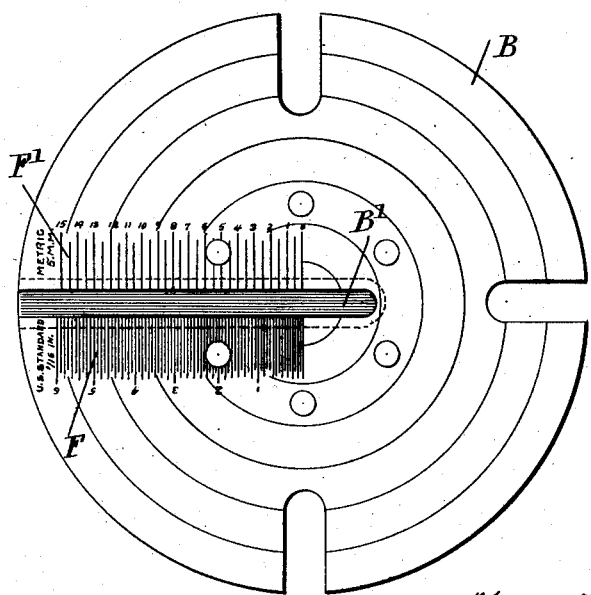
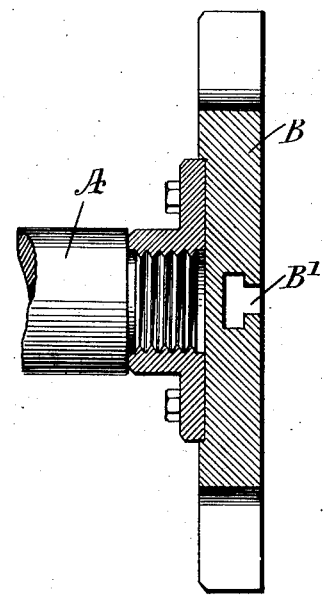
WITNESSES
INVENTOR
Frank L. Wheeling
Frederick A. Rogers
BY
Munn & Co.
ATTORNEYS F. L. WHEELING & F. A. ROGERS.
CENTERING DEVICE.
APPLICATION FILED SEPT. 21, 1911.
1,025,728.
Patented May 7, 1912.
2 SHEETS—SHEET 2.
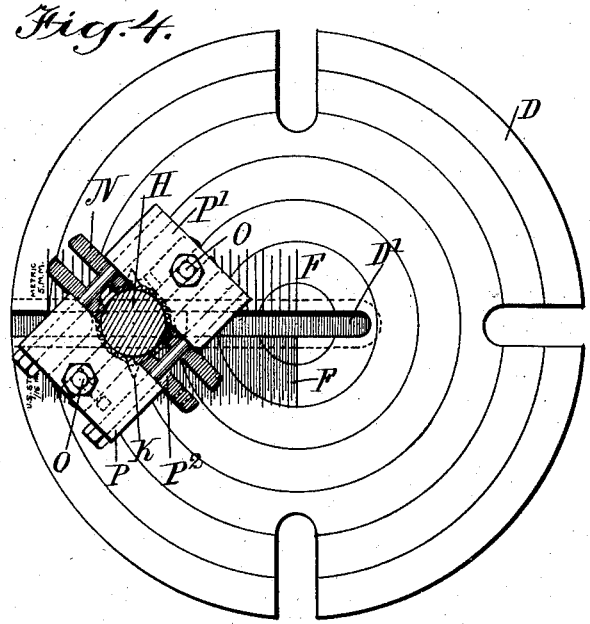
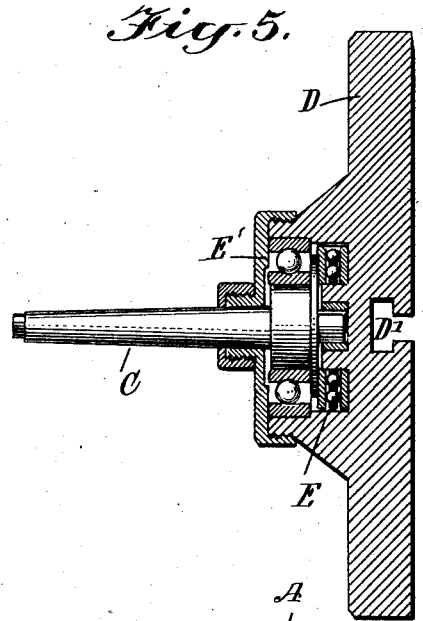
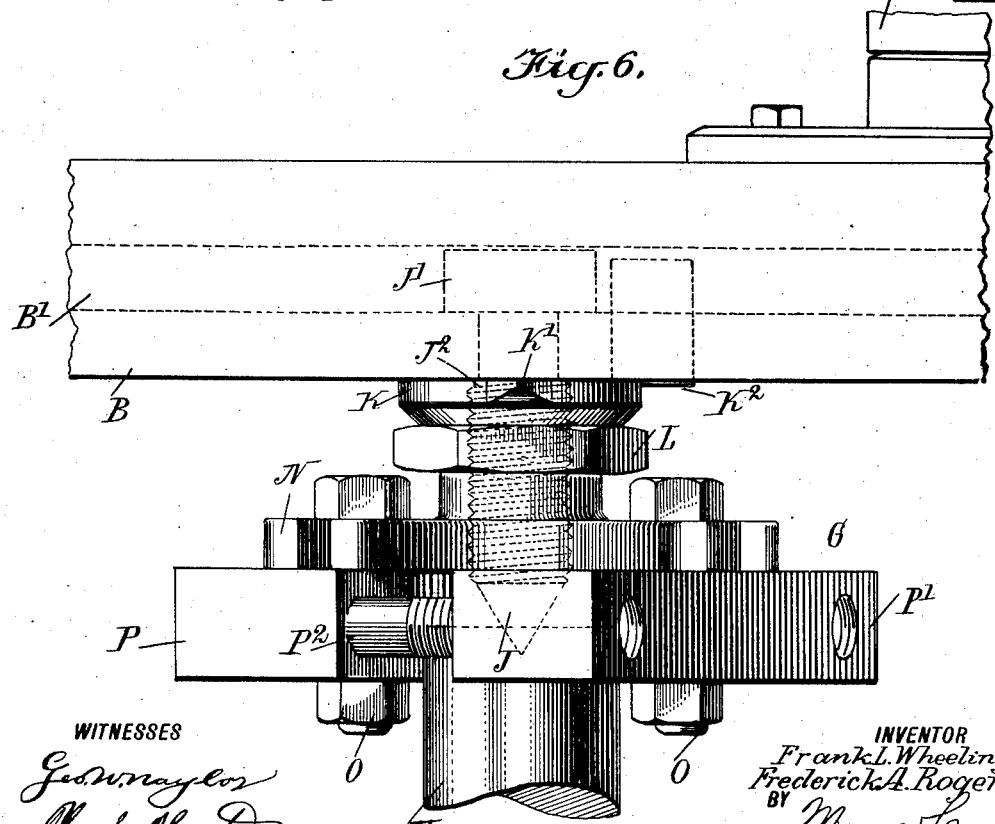

UNITED STATES PATENT OFFICE.

FRANK LAFYETT WHEELING AND FREDERICK ARTHUR ROGERS, OF LOS ANGELES, CALIFORNIA.

CENTERING DEVICE.

1,025,728.  Specification of Letters Patent.  Patented May 7, 1912.

Application filed September 21, 1911. Serial No. 650,513.

*To all whom it may concern:*

Be it known that we, FRANK L. WHEELING and FREDERICK A. ROGERS, both citizens of the United States, and residents of Los Angeles, in the county of Los Angeles and State of California, have invented a new and Improved Centering Device, of which the following is a full, clear, and exact description.

The object of the invention is to provide a new and improved centering device for use on lathes and similar machines, and more especially designed for centering "offset" work, such as crank shafts, cam shafts, valve eccentrics, and the like, arranged for keeping the work in one center while one or more cranks or cams are being turned.

For the purpose mentioned, use is made of a face plate attached to and rotating with the head stock spindle of the lathe, a tail stock face plate mounted to rotate freely on the tail stock spindle of the lathe, and work-carrying means adjustable laterally on the said face plates for supporting the ends of the work eccentrically to the axis of the said spindles.

A practical embodiment of the invention is represented in the accompanying drawings forming a part of this specification, in which similar characters of reference indicate corresponding parts in all the views.

Figure 1 is a rear perspective view of part of a lathe provided with the centering device, and showing a crank shaft in position for turning the cranks thereof; Fig. 2 is an enlarged face view of the face plate for the head stock spindle; Fig. 3 is a cross section of the same; Fig. 4 is an enlarged face view of the face plate on the tail stock spindle and the work-carrying means in position on the face plate and with the work shown in cross section; Fig. 5 is a cross section of the same; Fig. 6 is an enlarged plan view of the face plate on the head stock spindle and the work-carrying means on the said face plate; and Fig. 7 is a detail view showing the connection of the pointer with the face plate.

On the head stock spindle A of a lathe or similar machine is removably secured a face plate B, and on the said tail stock spindle C of the lathe is mounted to rotate freely a face plate D by the use of ball bearings E and a thrust bearing E', as plainly indicated in Fig. 5. The face plates B and D are provided with radially-disposed T-slots B', D', and on the face plates are arranged graduations F and F' indicating linear measurement, such as inches and subdivisions, or centimeters and subdivisions, the graduations ranging lengthwise of the slots B' and D' with zero at the centers of the face plates B and D.

On the face plates B and D are adjustably mounted work-centering and carrying means G and G' for engagement with the ends of the work H, having cranks, cams, eccentrics or like portions H' to be turned by the tool I on the tool-carrier I' of the lathe (see Fig. 1). The work-centering and carrying means G and G' for the face plates B and D are alike in construction, so that it suffices to describe but one in detail. Each of the centering and work-carrying devices is provided with a center J having a head J' slidingly engaging the T-slot B' or D', and the said center J is provided with a screw thread $J^2$, and on the center fits loosely a pointer K having diametrically opposite points K' for indicating on the graduations F and F', the pointer K also having a boss $K^2$ fitting into the slot B' or D' (see Fig 6) to hold the pointer K against turning. A nut L screws on the thread $J^2$ of the center J to fasten the pointer K and the center J in position on the face plate B or D, after the said center has been adjusted in the slot B' or D', according to the distance the center of the offset H' is from the center of the work H. Thus if the throw of the crank H' of the crank shaft H is three inches, the centers J are adjusted on the face plates B and D, so that the points K' of the pointers K indicate on the three-inch graduation marks of the graduations F. On the threaded end of each center J is mounted a dog, consisting essentially of a slotted carrier N, to which are adjustably secured by bolts O clamping members P and P' arranged on opposite sides of the center J and connected with each other by bolts $P^2$ so as to move the clamping members P and P' toward or from each other and in contact with the peripheral face of the end of the work H, the opposite faces of the clamping members P and P' being preferably serrated or roughened for taking a firm grip on the ends of the work H.

By the arrangement described the points of the centers J are adapted to engage the original centers at the ends of the work H, and as the centers J are adjusted on the face plates B and D a distance from the centers thereof corresponding to the throw of the offset work, it is evident that the offset work can be readily turned by the tool I on rotating the head stock spindle A so as to carry the work around with the axis of the offset work coinciding with the axis of the head stock spindle A and the tail stock spindle C. By the use of the carrying member N and the adjustable clamping members P and P' a ready change to different throws can be made and the original main bearing centers of the work utilized as before explained.

Having thus described our invention, we claim as new and desire to secure by Letters Patent:

1. A centering device for lathes, comprising a head stock face plate attached to and rotating with the head stock spindle of the lathe, a tail stock face plate mounted to rotate freely on the tail stock spindle of the lathe, centers adjustable laterally on the said face plates for engaging the ends of the work eccentrically to the axis of the said spindles, and means mounted on the said centers for engagement with the peripheral faces of the ends of the work.

2. A centering device for lathes, comprising a head stock face plate attached to and rotating with the head stock spindle of the lathe, the said face plate being provided with a radial slot and a graduation lengthwise of the slot and representing linear measurement, a tail stock face plate mounted to rotate freely on the tail stock spindle of the lathe and provided with a radial slot and a graduation lengthwise of the slot and representing linear measurement, centers adjustably mounted in the slots of the said face plates for supporting the ends of the work eccentrically to the axis of the said spindles, means carried by the centers for engaging the peripheral faces of the ends of the work, and pointers carried by the said centers for indicating on the said graduations.

3. A centering device for lathes, comprising a head stock face plate attached to and rotating with the head stock spindle of the lathe, the said face plate being provided with a radial slot and a graduation lengthwise of the slot and representing linear measurement, a tail stock face plate mounted to rotate freely on the tail stock spindle of the lathe and provided with a radial slot and a graduation lengthwise of the slot and representing linear measurement, centers slidably mounted in the slots of the said face plates, pointers on the said centers for indicating on the said graduations, and dogs mounted on the said centers for engagement with the work.

4. A centering device for lathes, comprising a head stock face plate attached to and rotating with the said head stock spindle of the lathe, the said face plate being provided with a radial slot and a graduation lengthwise of the slot and representing linear measurement, a tail stock face plate mounted to rotate freely on the said tail stock spindle of the lathe and provided with a radial slot and a graduation lengthwise of the slot and representing linear measurement, centers slidably mounted in the slots of the said face plates, pointers on the said center for indicating on the said graduations, means for fastening the said pointers and centers in position on the face plates, and dogs, each having an attaching member adapted to be fastened on the corresponding center, and clamping members adjustably mounted on the said attaching member for engagement with the work.

5. A centering device for lathes, provided with a face plate having a radial slot and a graduation lengthwise of the slot and indicating linear measurement, a threaded center slidably engaging the said slot, a pointer on the said center for indicating on the said graduation, the pointer resting against the face of the face plate, a nut screwing on the center against the said pointer to lock the pointer and center in place on the face plate, and a dog having an attaching member screwing on the said center, and clamping members adjustably mounted on the said attaching member on opposite sides of the point of the center.

6. A centering device for lathes, provided with a face plate having a radial graduation indicating linear measurement, and work-centering and carrying means laterally adjustable on the said face plate to locate the center of the said work-centering and carrying means eccentrically on the face plate and at a distance from the center of the plate indicated by the said graduation, the said work-centering and carrying means comprising a center, a member secured on said center, and clamping members adjustably mounted on the said member and arranged on opposite sides of the point of the center.

7. A centering device for lathes, provided with a face plate, a center laterally adjustable on the said face plate, a dog comprising a carrier mounted on the center and clamping members adjustably secured to the carrier and arranged on opposite sides of the center, and means for moving the said clamping members into contact with the work.

8. A centering device for lathes provided with a face plate having a radial T-slot and a graduation lengthwise of the slot and indicating linear movement, a center having a head slidingly engaging the said slot, the said center being provided with a screw threaded portion, a pointer fitting loosely on the center and having oppositely arranged points for indicating on the graduation, the said pointer resting against the face plate and having a boss fitting into the said radial slot to hold the pointer against turning, a nut screwing on the threaded portion of the center to fasten the pointer and the center in position on the face plate, a dog mounted on the threaded end of the center, and comprising a slotted carrier, and clamping members adjustably secured to the carrier and arranged on opposite sides of the center, and connections between the clamping members for moving the same in contact with the peripheral face of the end of the work.

In testimony whereof we have signed our names to this specification in the presence of two subscribing witnesses.

FRANK LAFYETT WHEELING.
FREDERICK ARTHUR ROGERS.

Witnesses:
HOBART G. HEIS,
JOHN A. MCDONALD.

Copies of this patent may be obtained for five cents each, by addressing the "Commissioner of Patents, Washington, D. C."